Figure 1:
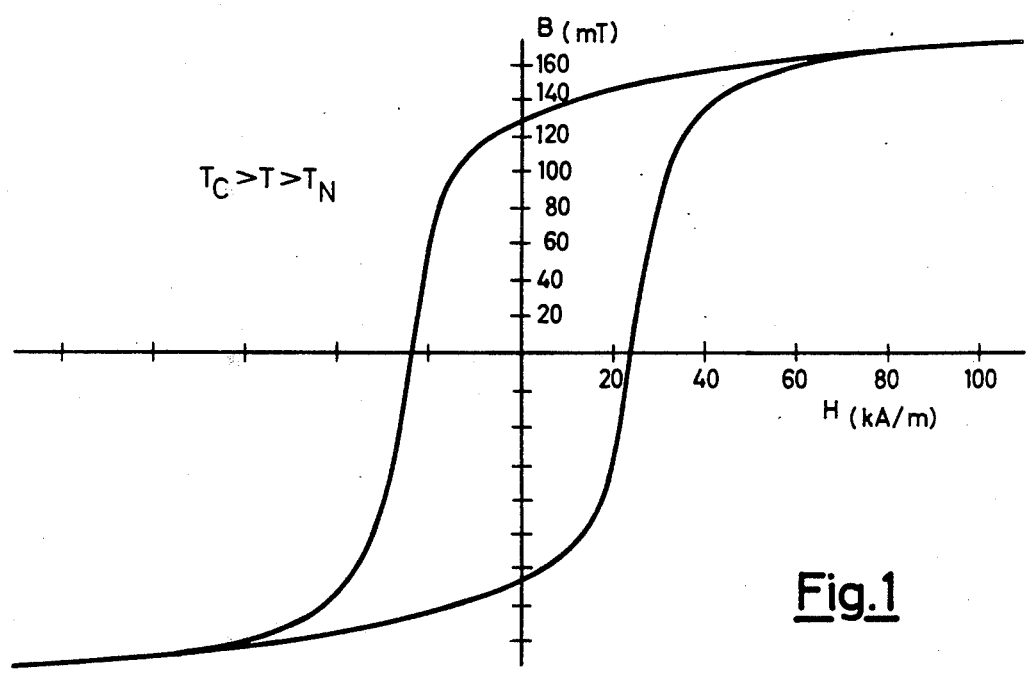

United States Patent [19]
Koester et al.

[11] 3,961,990
[45] June 8, 1976

[54] MANUFACTURE OF MAGNETIC MATERIALS WHICH EXHIBIT EXCHANGE ANISOTROPY

[75] Inventors: Eberhard Koester, Frankenthal; Gerd Wunsch, Speyer; Paul Deigner, Weisenheim; Karl Uhl, Frankenthal; Werner Stumpfi, Ludwigshafen; Werner Steck, Mutterstadt, all of Germany

[73] Assignee: BASF Aktiengesellschaft, Ludwigshafen (Rhine), Germany

[22] Filed: Dec. 23, 1974

[21] Appl. No.: 535,578

[30] Foreign Application Priority Data
Dec. 29, 1973 Germany.............................. 2365178

[52] U.S. Cl............................. 148/6.3; 148/105; 252/62.55
[51] Int. Cl.$^2$............................................ H01F 1/06
[58] Field of Search ........... 148/6.3, 104, 105, 31.5, 148/31.55; 427/128, 132; 252/62.51, 62.55; 75/170; 29/192 CP

[56] References Cited
UNITED STATES PATENTS

| | | |
|---|---|---|
| 1,695,041 | 12/1928 | Elmen............................... 148/31.55 |
| 1,954,102 | 4/1934 | Roseby................................ 148/104 |
| 3,460,968 | 8/1969 | Bate et al............................. 148/6.3 |
| 3,726,664 | 4/1973 | Parker et al. ....................... 148/105 |

*Primary Examiner*—Ralph S. Kendall
*Attorney, Agent, or Firm*—Johnston, Keil, Thompson & Shurtleff

[57] ABSTRACT

A process for the manufacture of magnetic materials containing a phase A with a ferromagnetic spin system, of composition $Co_xNi_{1-x}$ and a phase B with an antiferromagnetic spin system of composition $(CoO)_x(NiO)_{1-x}$, with values of $x$ from 0.05 to 0.96, the phases A and B showing exchange interaction. The materials are manufactured by surface oxidation of starting materials having a ferromagnetic layer, at least on the surface but optionally extending deeper, of composition A, to produce the antiferromagnetic phase B, nitrous oxide being used as the oxidant. Magnetic materials thus obtained have an asymmetrical hysteresis loop, which manifests itself at different temperatures, namely the particular Neel temperature of the phase B, which depends on the composition of the phases which varies in accordance with the values of $x$.

5 Claims, 2 Drawing Figures

MANUFACTURE OF MAGNETIC MATERIALS WHICH EXHIBIT EXCHANGE ANISOTROPY

The invention relates to a process for the manufacture of magnetic materials which consist of a phase A with a ferromagnetic spin system, especially a mixed crystal of metallic cobalt and metallic nickel, and a phase B with an antiferromagnetic spin system, especially the oxidized form of the metal composition of phase A, each phase in the crystal lattice being joined to the other in such a way that the two spin systems are coupled with one another below a temperature which is specific for the material, namely the Néel temperature, and show a different remanence after saturation in the two polarization directions. These materials are further characterized by a particle size which exhibits the behavior of a magnetic single domain.

In the general treatment of magnetic phenomena, materials are described as paramagnetic if the atoms of which they consist have a permanent magnetic moment and there is very little or no interaction between them. Conversely, if the interactions are pronounced, the exchange forces cause the moments of adjacent atoms to become oriented parallel to one another. If the moments are oriented in the same direction, that is to say if there is a positive interaction, the result is that the material is ferromagnetic, if there is a negative interaction in equal amount, the material is antiferromagnetic and if there is a negative interaction in unequal amount it is ferrimagnetic.

The externally active magnetic moment in ferromagnetic or ferrimagnetic materials can be influenced by external magnetic fields. If the field is reversed continuously, the magnetization is also reversed, in part discontinuously, into the opposite direction. The change in sign occurs, with many materials, not as the field passes through zero but in the ultimate opposite field, the coercive force. In the case of permanent magnets, so-called hysteresis results in the course of a complete cycle of the external magnetic field.

If two phases, a ferromagnetic phase and an antiferromagnetic crystal region, adjoin so that a magnetic interaction can extend beyond a crystal plane, an exchange interaction results, which is described as exchange anisotropy (W. H. Meiklejohn, J. Applied Physics, Vol. 33, Suppl. to No. 3 (1962), p. 1328 et seq.).

In order to obtain the desired effect of a preferred direction of the coupling of the two systems it is necessary that the Curie temperature $T_C$ of the ferromagnetic material, that is to say the temperature at which the thermal movement destroys the magnetic order, be greater than the Néel temperature $T_N$ of the antiferromagnetic material. Under these conditions the magnetization of the ferromagnetic phase becomes oriented, above $T_N$ in accordance with an externally applied high magnetic field. If a temperature below $T_N$ is chosen next, the plane of the magnetic moments of the antiferromagnetic material which is nearest to the ferromagnetic material becomes ordered in the same direction, whilst the further ordering takes place antiferromagnetically. Where the antiferromagnetic order is very tied to the crystal lattice, i.e. where there is high crystal anisotropy, the magnetization of the ferromagnetic material is held, as a result of the coupling, in the same direction as that which acted on the material whilst it was being cooled to below the Néel temperature. Such a material posesses vector anisotropy and in an alternating field a hysteresis curve shifted parallel to the field direction results.

In addition to this effect, a characteristic of exchange anisotropy which is found in materials with high crystal anisotropy is a torque curve in the shape of a sine $\theta$ function, whilst the rotational hysteresis losses in high fields are in most cases no longer zero.

An important precondition of a measurable effect based on exchange interaction is that the ferromagnetic material must consist of a magnetic single domain. Only in a magnetic single domain is the spontaneous magnetization uniform as a result of the interaction of the atomic magnetic moments, and is the coupling to the antiferromagnet therefore completely effective over the (entire) interface Known materials which exhibit such properties include, above all, the systems cobalt/cobalt oxide and nickel/nickel oxide (U.S. Pat. No. 3,110,613). The literature also describes the exchange anisotropy phenomenon for iron/iron(II) oxide, $\alpha$-iron-(III) oxide, lanthanum ferrite, some alloys of manganese, some alloys of iron and others (W. H. Meiklejohn, J. Appl. Physics, Vol. 33, Suppl. to No. 3 (1962), p. 1,328 et seq.). It is also known that these materials do not in every case show all the characteristics of exchange anisotropy, so that various materials have been investigated, depending on the intended use. Thus it is known that in the case of magnetic systems which contain nickel oxide, the rotational hysteresis losses do not disappear in high fields, because of the low crystal anisotropy of the material, but on the other hand a shifted hysteresis loop is not observed (H. Schmid, Kobalt No. 6 (1960), p. 8 – 14).

U.S. Pat. Nos. 2,988,466 and 3,110,613 describe the relatively high rotational hysteresis losses of such magnetic materials, which do not vanish even if high magnetic fields are applied, as being particularly suitable for hysteresis motors. A metal from the group of iron, cobalt and nickel is mentioned as the ferromagnetic phase and an oxide of the metal as the predominantly antiferromagnetic phase.

Barium-potassium ferrites are also known (U.S. Pat. No. 3,284,359) which in addition to the peculiarities of rotational hysteresis also exhibit an asymmetrical hysteresis loop. A shifted hysteresis loop was also found in systems which contain $\gamma$-iron(III) oxide and $\alpha$-iron(III) oxide or chromium trioxide ($Cr_2O_3$).

It has also already been proposed to use magnetic materials exhibiting exchange anisotropy and in particular possessing an asymmetrical hysteresis loop as magnetizable materials for magnetic recording media since they permit the manufacture of media whereof the information content can subsequently no longer be altered without it being noticed.

A disadvantage of the conventional materials possessing exchange anisotropy is that it is not possible to vary their specific properties through modification of the system. Thus, for example, the Neel temperature above which the magnetization of the ferromagnetic constituent can be modified and below which the exchange anisotropy comes into play lies outside the temperature range which numerous applications demand.

In addition, the inadequate ferromagnetic magnetization prevents the use of many systems in which there should be a correlation between the permanent magnet properties, such as for example, high remanence, and the chosen Néel temperature.

It is an object of the invention to provide magnetic pigments which as a result of exchange anisotropy exhibit an asymmetrical hysteresis loop, which have magnetic properties determined by their behavior as single-domain particles, and which have a Néel temperature which can be varied within wide limits through varying the composition of the systems which exhibit exchange interaction.

We have found that magnetic materials which contain a ferromagnetic phase A of composition $[Co_x Ni_{1-x}]$ and an antiferromagnetic phase B of composition $[(CoO)_x (NiO)_{1-x}]$, in each of which $x$ is from 0.05 to 0.96, can be manufactured by surface oxidation of a material having a ferromagnetic layer of composition A, at least on the surface but optionally extending deeper, to form the antiferromagnetic phase B, the phase B being magnetically coupled to the phase A, if the oxidizing agent used to produce the antiferromagnetic phase B is nitrous oxide ($N_2O$).

The magnetic materials consist essentially of a cobalt-nickel alloy as the ferromagnetic material (phase A), the proportion of cobalt being from 5 to 96, and preferably from 40 to 90, atom per cent. The particle size of the magnetic pigments is such that the particles are magnetic single domains the ferromagnetic part preferably being greater than 100 A and less than 1,000 A. In the process of manufacture according to the invention, a surface layer of the ferromagnetic phase is oxidized so as to grow an oxide layer, of which the crystallographic order in at least one interfacial layer is appropriate for coupling of the spin systems. This antiferromagnetic interfacial layer of the phase B should be not less than 40 A thick. There is no upper limit imposed to ensure its proper functioning. Since the antiferromagnetic phase does not contribute to the effective magnetic moment, the oxide layer should not be substantially more than 1,000 A thick.

A further advantageous structure of the materials produced according to the invention comprises a system of several layers of the two phases A and B. In such materials, the two phases alternate. This structure makes it possible to increase the effective area over which the coupling of the ferromagnetic and antiferromagnetic system occurs.

In a preferred embodiment, only a part of the magnetic material according to the invention exhibits the exchange interaction, in particular an asymmetrical hysteresis loop.

The materials according to the invention can contain additional elements in each phase. Possible modifiers are any metals present in such amounts that they do not completely prevent the exchange interaction between the metallic phase A and the oxide phase B. In particular, iron, manganese, zinc, chromium, aluminum and other metals can be added. The amounts in which such additives do not interfere with the manufacture of the materials according to the invention is easily determined experimentally and depends on the incorporation of the particular material into the particular crystal lattice.

In the manufacture of the materials according to the invention, suitable metal pigments, consisting essentially of the ferromagnetic phase A $[Co_xNi_{1-x}]$, with values of $x$ of from 0.05 to 0.96, are provided, superficially only, with an oxide layer, using $N_2O$ as the oxidant, under conditions such that this oxide layer of composition $[(CoO)_x (NiO)_{1-x}]$ (Phase B), $x$ having the above values, has the structure of a mutual interfacial layer so as to bring about an interaction of the two spin systems.

The use of nitrous oxide ($N_2O$) has proved particularly advantageous compared to the use of other oxidants; preferably, $N_2O$ is used as a gaseous mixture with inert gases, for example nitrogen, carbon dioxide or noble gases. Other gas mixtures, in which nitrous oxide predominates, can also be used.

Though it is also possible to use, as the oxidant, any substance which oxidizes finely divided metallic cobalt and nickel, such as, above all, air or the other inorganic or organic gaseous oxidants, as well as liquid oxidants, e.g. hydrogen peroxide, it is advisable, in the case of magnetic materials with exchange anisotropy in which the antiferromagnetic phase has been produced in this way, to carry out a heat treatment in an inert gas atmosphere at temperatures of from 100° to 450°C to achieve a sufficient exchange anisotropy effect, especially a shift of the hysteresis loop.

Surprisingly, the oxidation of the metal particles with $N_2O$ in accordance with the invention, on the other hand, gives excellent exchange anisotropy values directly, without additional after-treatment. Even nitrogen monoxide and nitrogen dioxide do not, without an after-treatment, give the particularly advantageous exchange anisotropy achievable by the process according to the invention.

The proportion of magnetic pigment with exchange anisotropy in the total material can be characterized by the parameter $j_{er}$. $j_{er}$ can be determined by saturating the magnetic material in a field of 160 kA/m, heating it under the influence of the field to above the particular Neel temperature and again cooling it. The specimen is then placed in an alternating field of 200 kA/m which slowly decreases to zero. The value of $j_{er}$ is obtained from the residual remanence, expressed as a percentage of the remanence of the material after saturation at 160 kA/m but prior to heating.

However, if these magnetic materials are used for recording media in accordance with German patent application P 23 44 644.8, it is not only the intensity of the exchange anisotropy effect which is of importance but also the remanent magnetization. A measure of the quality of such a material is the product of the remanence and of the proportion of exchange anisotropy $[B_{Rl} \rho \times j_{er}]$. The greater this product is, coupled with maximum possible remanence of the magnetic materials, the better suited are the materials for use in magnetic recording techniques, especially in a recording process in which information, once recorded, cannot be altered without it being noticed.

In the table which follows, these measurements on the magnetic materials produced by the process of manufacture according to the invention are compared, for a remanence range taken by way of example, with measurements on materials in which the antiferromagnetic phase has been produced by oxidation with a mixture of nitrogen and air, followed by heating.

| Manufacture of the materials which exhibit exchange anisotropy | $B_{Rl}\rho$ at 160 kA/m [nTm³/g] | $j_{er} \times B_{Rl}\rho$ [nTm³/g] |
|---|---|---|
| According to the invention | 20 – 24 | 3.8 to 6.4 |
| Surface oxidation of the ferromagnetic phase with $N_2$/air and subsequent heating | 20 – 24 | Approx. 2.5, maximally up to 3.6 |

The starting materials for the process of manufacture according to the invention are metal pigments. In the sense of our invention, this term is to be understood to include all materials which consist predominantly of a metallic phase which must be present in at least one completely continuous surface layer. Preferably, the thickness of the metallic constituent should be not less than 100 Angstrom and not more than 1,000 Angstrom.

The manufacture of magnetic metal pigments of appropriate particle size is known, as is the production of an oxide skin on the surface of the particles, to prevent pyrophoric phenomena (Printed German Application No. 1,171,160).

When manufacturing the metal pigments suitable for the process according to the invention, mixed oxides of the elements cobalt and nickel are used which contain the desired ratio of the metals, corresponding to the chosen value of $x$. Such mixed oxides can in particular be obtained by decomposition of such metal compounds as the nitrates, carbonates, formates and oxalates. Dehydration of the hydroxides is a particularly advantageous method of obtaining the appropriate mixed oxides and is carried out under an inert gas, for example nitrogen, at temperatures of up to 650°C, preferably up to 450°C. Magnetic pigments according to the invention, having a particularly suitable structure, are obtained by treating the precipitated mixed hydroxides of the appropriate composition in the precipitation liquid at temperatures of from 100° to 250°C, under autogenous pressure.

These mixed oxides are converted into the corresponding metal pigments by means of reducing agents, preferably by means of reducing gases or gas mixtures, in particular by means of hydrogen gas under normal pressure and at temperatures of up to 500°C, preferably of from 200° to 450°C.

Another suitable method of manufacture of appropriate metal pigments entails the decomposition of the mixed metal carbonyls corresponding to the metal composition of the phase A or entails other conventional reductive, thermal or electrolytic methods.

The partial oxidation which produces an oxide constituent of the antiferromagnetic structure coupled to the ferromagnetic metal phase is carried out, according to the invention, with nitrous oxide, preferably mixed with inert gases. The reaction temperature is up to 450°C, preferably from 40° to 400°C.

The oxidation temperature determines the duration of oxidation and the ratio of nitrous oxide to inert gas. In practice, ratios of $N_2O$ to inert gas of from 1:4 to 1:50, preferably from 1:10 to 1:20 are chosen, but higher and lower ratios can also be used.

The process of the invention makes it possible to manufacture magnetic materials of different structures, having a shifted hysteresis loop. In one of the embodiments, the materials consist of a core of the metallic ferromagnetic phase A whilst only a thin surface layer is an antiferromagnetically ordered oxide layer of phase B.

It has also proved advantageous to employ a metal pigment which only consists essentially of a metal phase A in the form of a continuous surface layer. If such a material is oxidized in accordance with the invention, the end product consists of an inner shell of phase A and an outer layer of phase B.

Figure 2:
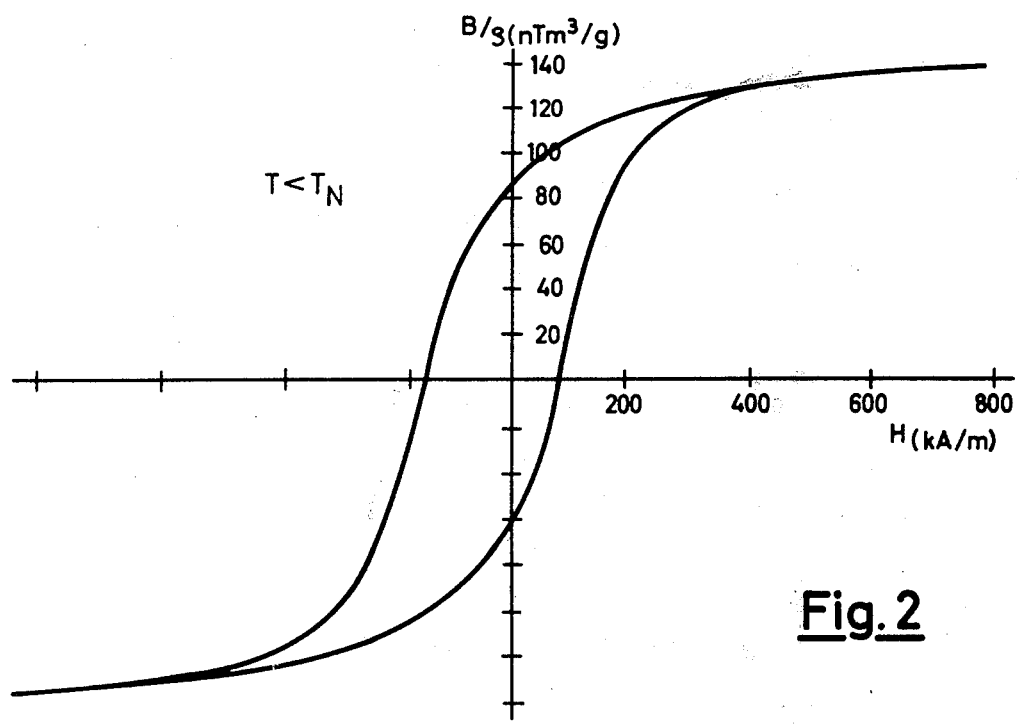

The state of the art did not lead to the expectation that the magnetic materials composed of a ferromagnetic phase A $[Co_xNi_{1-x}]$ and an antiferromagnetic phase B $[(CoO)_x(NiO)_{1-x}]$, $x$ denoting any value from 0.05 to 0.96, manufactured by the process according to the invention, would show an asymmetrical hysteresis loop. FIG. 1 shows such a material above the Néel temperature $T_N$ but below the Curie temperature $T_C$. After the material has been cooled to below $T_N$ in an external magnetic field, a hysteresis curve as shown in FIG. 2 results. By way of example, materials according to the invention give shifts of the hysteresis curves, along the field axis, of from 10 oersteds at room temperature to 200 oersteds at −140°C.

The materials manufactured according to the invention provide magnetic pigments with an asymmetrical hysteresis loop which can be utilized optimally for any particular application because the Néel temperature can be varied and selected by simple choice of the cobalt-nickel composition of the starting material. Thus, the Néel temperatures of the materials manufactured according to the invention can be from 28°C to 236°C, depending on the ratio of cobalt to nickel.

The examples which follow illustrate the process of manufacture according to the invention. The following parameters are employed: $B_{S/\rho}$ [$nTm^3/g$] for the specific induction of the material, and $B_{R/\rho}$ [$nTm^3/g$] for the specific remanence. $j_{er}$ is shown as a measure of the proportion of magnetic pigment exhibiting exchange anisotropy, in the total composition of the material.

EXAMPLE 1

200 g of NaOH were dissolved in 2,750 ml of water in a 6 l four-neck flask, the solution was warmed to 80°C and 356 g of $CoCl_2.6\ H_2O$ and 118 g of $NiCl_2.6\ H_2O$, dissolved in 1,250 ml of water, were added dropwise in the course of 40 minutes whilst stirring (at about 300 rpm) and passing nitrogen (120 l of $N_2$/hr.) through the flask. After completion of the addition, the mixture was stirred for a further 2.5 hours at 80°C. The hydroxide precipitate $Co_xNi_{(1-x)}(OH)_2$ wherein $x = 0.75$, contained in a part of the mother liquor, was introduced into a 3 l tumbler autoclave and kept at 200°C under autogenous pressure for 24 hours. The precipitate was then filtered off, washed with distilled water and dried in vacuo at 50°C.

The product was reduced with 100 l of hydrogen per hour at 300°C for 16 hours, resulting in a metal pigment of composition $Co_{0.75}Ni_{0.25}$ which still contained 1.3% of residual oxygen.

70 g of the metal pigment were oxidized in a bulb tube at 200°C for 2.5 hours with a gas mixture of 5 l of nitrous oxide and 100 l of nitrogen per hour. The following values were measured at 160 kA/m field strength on the resulting material, which exhibited exchange anisotropy and had an oxygen content of about 16%:

$H_c = 60.8$ kA/m
$B_{S/\rho} = 30\ nTm^3/g$
$B_{R/\rho} = 14\ nTm^3/g$
$j_{er} = 29.3\%$
$T_N = 75°C$ Accordingly, the product $[j_{er} \times B_R/]$ was 4.1 $nTm^3/g$.

EXAMPLE 2

A metal pigment of composition $Co_{0.6}Ni_{0.4}$ was obtained from a mixed hydroxide, prepared analogously to Example 1, by appropriate reduction with hydrogen. 70 g of this material were oxidized with a mixture of 5 l of nitrous oxide and 100 l of nitrogen at 250°C in the course of 35 minutes. The magnetic values, at 160 kA/m, of the material obtained were:
$H_c = 42.3$ kA/m
$B_{S/\rho} = 59.5$ nTm$^3$/g
$B_{R/\rho} = 26.8$ nTm$^3$/g
$j_{er} = 22\%$
$T_N = {\sim}102°C$
$[j_{er} \times B_{R/}] = 5.9$ nTm$^3$/g

EXAMPLE 3

70 g of the metal pigment $Co_{0.75}Ni_{0.25}$, prepared according to Example 1, were oxidized in the course of 30 minutes with 10 l of nitrous oxide and 100 l of nitrogen per hour. The magnetic values measured at 160 kA/m field strength were:
$H_c = 62.3$ kA/m
$B_{S/\rho} = 49.0$ nTm$^3$/g
$B_{R/\rho} = 23.4$ nTm$^3$/g
$j_{er} = 21.6\%$
$T_N = {\sim}75°C$
$[j_{er} \times B_{R/\rho}] = 5.05$ nTm$^3$/g After heating this material for 4 hours at 400°C under nitrogen, the following magnetic values were measured:
$H_c = 53.9$ kA/m
$B_{S/\rho} = 49.0$ nTm$^3$/g
$B_{R/\rho} = 22.0$ nTm$^3$/g
$j_{er} = 12\%$
$T_N = {\sim}75°C$
$[j_{er} \times B_{R/\rho}] = 2.64$ nTm$^3$/g

We claim:

1. A process for the manufacture of magnetic pigments exhibiting exchange anisotropy and consisting essentially of two-phase magnetic single-domain particles with the alloy $[Co_xNi_{1-x}]$ as a ferromagnetic phase A and its oxidized form $[(CoO)_x(NiO)_{1-x}]$ as an antiferromagnetic phase B, $x$ being from 0.04 to 0.96, which comprises:

heating said alloy $[Co_xNi_{1-x}]$ in particulate form at temperatures up to 450°C in the presence of gaseous nitrous oxide ($N_2O$) to oxidize the surface of the particles to a depth of from 40 to 1000A to the antiferromagnetic phase $B[(CoO)_x(NiO)_{1-x}]$.

2. A process as set forth in claim 1 wherein said temperature is from 40° to 400°C.

3. A process as set forth in claim 2 wherein nitrous oxide is mixed with inert gases.

4. A process as set forth in claim 3 wherein the ratio of nitrous oxide to inert gases is from 1:4 to 1:50.

5. A process as set forth in claim 3 wherein the ratio of nitrous oxide to inert gases is from 1:10 to 1:20.

* * * * *